US008599195B2

(12) United States Patent
Khulusi (10) Patent No.: US 8,599,195 B2
(45) Date of Patent: Dec. 3, 2013

(54) APPARATUS AND METHOD FOR MODELING ALL MATTER BY MODELING, TRUNCATING, AND CREATING N-DIMENSIONAL POLYHEDRA INCLUDING THOSE HAVING HOLES, CONCAVE ATTRIBUTES, AND NO SYMMETRY

(76) Inventor: Basimah Khulusi, Kansas City, MO (US)

( * ) Notice: Subject to any disclaimer, the term of this patent is extended or adjusted under 35 U.S.C. 154(b) by 933 days.

(21) Appl. No.: 12/689,861

(22) Filed: Jan. 19, 2010

(65) Prior Publication Data

US 2010/0118029 A1     May 13, 2010

Related U.S. Application Data

(63) Continuation-in-part of application No. 11/686,496, filed on Mar. 15, 2007, now abandoned.

(51) Int. Cl.
*G06T 15/00* (2011.01)
*G06T 17/00* (2006.01)
*G06T 15/10* (2011.01)
*G06T 15/50* (2011.01)

(52) U.S. Cl.
USPC ............ 345/419; 345/420; 345/426; 345/427

(58) Field of Classification Search
None
See application file for complete search history.

(56) References Cited

U.S. PATENT DOCUMENTS

| | | | |
|---|---|---|---|
| 5,113,490 A | 5/1992 | Winget | |
| 5,428,717 A | 6/1995 | Glassner | |
| 6,139,160 A * | 10/2000 | Frucht | 359/850 |
| 6,307,554 B1 * | 10/2001 | Arai et al. | 345/423 |
| 6,396,494 B1 | 5/2002 | Pittet | |
| 2002/0186216 A1 * | 12/2002 | Baumberg et al. | 345/422 |
| 2008/0040984 A1 * | 2/2008 | Lanahan | 52/79.9 |

OTHER PUBLICATIONS

International Search Report and Written Opinion issued in related PCT Patent Application Serial No. PCT/US2008/057238, dated Oct. 12, 2009, 15 pages.
International Preliminary Report on Patentability issued in related PCT Patent Application Serial No. PCT/US2008/057238, dated Oct. 20, 2009, 7 pages.
Select File History from related U.S. Appl. No. 11/686,496, dated Jun. 27, 2007 to Nov. 24, 2009, 69 pages.
Webb, Robert, "Stella: Polyhedron Navigator", 2001, www.software3d.com/Stella.php.
Webb, Robert, "Stella: Polyhedron Navigator", Symmetry: Culture and Science, vol. 11, Nos. 1-4, p. 231-268, 2000.
Stella Version History, www.software3d.com/History.php, #41, 2001.

* cited by examiner

*Primary Examiner* — Tize Ma
(74) *Attorney, Agent, or Firm* — Lathrop & Gage LLP (57) ABSTRACT

An apparatus and method for modeling all matter by modeling, truncating, and creating general polyhedra without requiring advanced computer processors and computer memory according to one embodiment includes at least one processor, means for inputting vertex data to the processor, a display in data communication with the processor, and computer memory coupled to the processor. The computer memory has recorded within it machine readable instructions for storing vertex data previously input to the processor, truncating a polyhedron created using the vertex data, and actuating the display. The instructions for creating and truncating a polyhedron utilize length data and angle data for triangles formed from the vertex data.

9 Claims, 7 Drawing Sheets

APPARATUS AND METHOD FOR MODELING ALL MATTER BY MODELING, TRUNCATING, AND CREATING N-DIMENSIONAL POLYHEDRA INCLUDING THOSE HAVING HOLES, CONCAVE ATTRIBUTES, AND NO SYMMETRY

RELATED APPLICATIONS

This application is a continuation-in-part of U.S. patent application Ser. No. 11/686,496, filed Mar. 15, 2007 now abandoned the disclosure of which is incorporated herein by references.

BACKGROUND OF THE INVENTION

It has been theorized that a single simple rule generates all known complexity demonstrated by matter. Nevertheless, matter is currently described and depicted using many complex formulas. While drafting and geometrical computer programs have become commonplace, they rely on numerous complex formulas and require advanced computer processors and computer memory, and they cannot be used to model, truncate and create all "General Polyhedra".

A simple computational method for modeling, truncating and creating "General Polyhedra" that allows one to model and study any form in n dimensions has been needed. N-dimensional forms are created from lines, polygons, and polyhedra. For example, a 2-dimensional polygon has 1-dimensional sides, a 3-dimensional polyhedron has sides or faces which are 2-dimensional polygons, a 4-dimensional polyhedron has sides that are 3-dimensional polyhedra, etc. A 4-dimensional polyhedron that has four sides, for example, could be constructed by building a 3-dimensional "core" polyhedron, and building four "side" 3-dimensional polyhedra that represent the sides of the 4-dimensional polyhedron. Each "side" 3-dimensional polyhedron has a face with dimensions that are mirror image with one face of the "core" 3-dimensional polyhedron, etc.

Old methods have named polyhedra and grouped them into special categories depending on their characteristics. A "General Polyhedron" may be referred to in this new method simply as "Polyhedron" with "Polyhedra" for plural, has n dimensions where n faces can have a common edge, can be concave or convex and can have holes or no holes, and can have symmetry or no symmetry. That represents all matter.

Old Art to model, truncate, and manipulate polyhedra has had limitations that do not generalize to all general polyhedra. First, the definition of polyhedra has been unsatisfactory. Polyhedra have been named and grouped into categories based on some common characteristics that they share. A defining characteristic of almost all kinds of polyhedra has been that just two faces join along any common edge. A polyhedron has been a 3-dimensional example of the more general polytope in any number of dimensions. Then, truncation of the polyhedron as defined in Math World has been the removal of portions of solids falling outside a set of symmetrically placed planes. Truncation displaces points along the edges of a polyhedron by a ratio r less or equal to ½, where r is the fraction of the edge length at which to truncate, and then constructing the new polygons. And rectification is the process of truncating a polytope by marking the midpoints of all its edges, and cutting off its vertices at those points.

Another prior art method, described in U.S. Pat. No. 5,428,717 to Glassner, can truncate only a simply connected concave object with no holes, by transforming it first to its convex hull by popping and sliding the concave edges, identifying midpoints of edges to be used for computations and then truncating the convex hull using computations of intersecting moving planes and half spaces inspired by the classical construction of dual polyhedra. The dual of a Platonic solid or Archamedean solid, for example, can be computed by connecting the midpoints of the sides surrounding each polyhedron vertex, and constructing the corresponding tangential polygon. Then the truncated convex hull will have to be converted again to the concave goal shape. The Glassner method requires extensive computation and has its obvious limitations.

Another prior art method, described in U.S. Pat. No. 6,396,494 to Pittet, frames the object to be studied with known geometric shapes of their choice like the tetrahedra that form a cube, then slices said geometric shapes using computations of intersecting planes. To speed up such very complex computations that require special quick hardware such as processors and computer systems, labor intensive information for a limited number of slices, 16 predetermined slices in this instance only, are computed by the operator first, then pre-entered into the system to be used, which leads to limited possibilities and missed information.

The invention disclosed herein uses simple mathematical computations of angles and side lengths of triangles to model and truncate any n-dimensional General Polyhedron, not limiting truncation up to the midpoint of edges of the polyhedron, and not using complex calculations of intersecting planes or half planes, or intersecting moving planes and half spaces. Using this new method, and changing the value of a few variables, one can quickly truncate any polyhedron along any edge by any proportion possible of that edge, and at any angle possible ad infinitum, without disregarding any information.

More particularly, using this novel simple computational method, one can model a Polyhedron. Then one can truncate or slice or clip any vertex of said polyhedron at any angle or in parallel, and along any proportion of each and every edge of said polyhedron that meet at said vertex from 0% and up to the maximum amount of truncation possible. Truncating said polyhedron would create new faces of the polyhedron that can be measured and built thus creating an infinite amount of new polyhedra. Then one can model another one or more new polyhedron with one face that has dimensions that are mirror image with either an old face of the polyhedron, or with a new face created by the truncation. Having the old and new polyhedron share a face will create one more new polyhedron. And so on and so forth, one can imagine the infinite complexity that can be generated and studied. For example, one can tessellate n-dimensional spaces by filling them with n-dimensional polyhedra.

One can also model a new polyhedron with all its faces having mirror image dimensions of the faces of the original polyhedron, thus being able to depict a R handed polyhedron and a L handed polyhedron for example, which will facilitate study.

Using this novel method, the polyhedron built will help us be able to model, understand and manipulate structures at the nano scale for the study of molecular biology for example, or bioinformatics, organic chemistry, crystallography etc; and structures at the macro scale to build objects that can be perceived by our senses; and structures at such large scale that our senses cannot perceive. And since physics describes matter as the geometric distribution of forces in space, then the study and use of this method that uses only angles and side lengths of triangles may help us understand these forces. The geometric distribution of forces also helps us understand the other structures in life, like the dynamics in a family or corporation. In a family, for example, the special bond between the father and daddy's little girl, the special bond between the mother and the son, and the special bond between the father and the mother, define a triangle of their own. Thus the triangle is the trinity that is the one that is the everything.

The present invention will become obvious after the following description.

SUMMARY OF THE INVENTION

One method disclosed herein for modeling and truncating polyhedra includes the steps:

Providing vertex data.

Establishing lines with known lengths between the vertices.

Establishing triangles with known angles from the established lines. Some of these triangles form triangular faces of the vertices of the polyhedron, and the other triangles are polyhedron virtual triangles.

Identifying which triangles belong to the same polygon.

Forming polygons that define the faces of the polyhedron using the triangular faces that may overlap.

Identifying the triangular faces of each vertex.

Identifying the polyhedron virtual triangles of each vertex.

Identifying the triangular faces of the polyhedron as forming the boundary of the polyhedron.

Identifying the triangular faces and the polyhedron virtual triangles that define the boundary shape of the polyhedron.

Identifying the triangular faces and the polyhedron virtual triangles that extend inside the boundary shape of the polyhedron.

Identifying the adjacent vertices of each vertex to be truncated,

Establishing truncating bases for each vertex to be truncated.

Forming truncating base triangles that are used to compute the truncating bases using each three vertices adjacent to the vertex to be truncated that are adjacent to each other and that belong to the boundary shape of the polyhedron.

Referring to these vertices as adjacent vertices.

Forming two of the truncating base lines of the vertex to be truncated using two sides of each of the truncating base triangles.

Noting that triangular faces and polyhedron virtual triangles of the vertex to be truncated that extend inside the boundary shape of the polyhedron intersect at determined intersecting angles and intersecting lines with the established truncating base triangles. Determine which triangular faces and which polyhedron virtual triangles intersect with which truncating base triangle.

Calculating all the intersecting angles and intersecting lines for all truncating base triangles and their intersecting triangular faces and polyhedron virtual triangles.

Calculating the points where the intersecting lines intersect with the rest of the edges of the Vertex to be truncated.

Calculating the lengths of the rest of the truncating base lines that complete the truncating bases for each vertex to be truncated using the intersecting angles and distances generated by the intersecting lines.

Forming truncating virtual triangles that have sides with known lengths and angles from the truncating base lines.

Forming truncating polygons with the truncating base lines as its sides for the truncating bases.

Forming new truncating lines to truncate parallel to the truncating bases; forming new truncating lines to truncate at an angle to the truncating bases; or forming new truncating lines to truncate parallel to truncation at an angle to the truncating bases.

Establishing the dimensions of the new truncating virtual triangles with known side lengths from the new truncating lines.

Forming new truncating polygons from the new truncating triangles.

Establishing the real truncating base that intersects with all the edges of the vertex to be truncated at either one of its truncating bases if said truncating base does not intersect with all the edges to be truncated when it intersects with the line extension of some of those edges. Establishing said real truncating base at an angle to said truncating base.

Optionally truncating the vertices of the polyhedron at either one of their truncating bases when it intersects with all the edges to be truncated.

Optionally designating the truncating bases that intersect with all the edges to be truncated as real truncating bases only for the purpose of truncating at said truncating bases and for the purpose of determining limits on truncation.

Optionally truncating the Vertex to be truncated at one or more of its real truncating bases knowing that truncating at one real truncating base will limit the amount of truncation at the other real truncating bases.

Determining the limits on truncation by lengths of edges to be truncated and values of the angles that determined the real truncating bases and limits based on the amount of previous truncation at said vertex and at adjacent vertices.

Optionally displaying the results of the truncation by displaying the information that belongs to the polygonal faces of the polyhedron only.

Optionally displaying the results of the truncation on a polyhedral net.

Optionally displaying the results of the modeling and truncating by displaying the faces of the polyhedron separate from each other.

Optionally, one can get vertex and line length data of an object from real life, then display that information, and then proceed to truncate this object using the method described above.

An apparatus for creating and truncating general polyhedra without using complex formulas and without requiring advanced computer processors and computer memory according to one embodiment includes at least one processor, means for inputting vertex data to the processor, a display in data communication with the processor, and computer memory coupled to the processor. The computer memory has recorded within it machine readable instructions for storing vertex data previously input to the processor, truncating a polyhedron created using the vertex data, and actuating the display. The instructions for creating and truncating a polyhedron utilize length data and angle data for triangles formed from the vertex data.

An apparatus for creating and truncating general polyhedra according to another embodiment includes at least one processor, means for inputting vertex data to the processor, a display in data communication with the processor, and computer memory coupled to the processor. The computer memory has recorded within it machine readable instructions for storing vertex data previously input to the processor, truncating a polyhedron created using the vertex data and actuating the display. The instructions for creating and truncating a polyhedron utilize length data and angle data for triangles formed from the vertex data and do not require advanced computer processors and advanced computer memory.

An apparatus for determining properties of general polyhedra without using complex formulas and without requiring advanced computer processors and computer memory according to one embodiment includes at least one processor, means for inputting vertex data to the processor, a display in data communication with the processor, and computer memory coupled to the processor. The computer memory has recorded within it machine readable instructions for storing vertex data previously input to the processor, the vertex data being associated with polyhedra, creating triangles using the vertex data, determining at least one property of the triangles, determining at least one property of the polyhedra using the at least one determined property of the triangles, and actuating the display.

DESCRIPTION OF THE PREFERRED EMBODIMENT

An apparatus and method according to the present invention will now be described in detail with reference to FIGS. 1 through 7 of the accompanying drawings.

According to embodiments disclosed herein, all truncated polyhedra can be generated using the simple mathematics of calculating angles and side lengths of triangles. The infinite amount of truncated polyhedra thus generated may form an infinite amount of n dimensional polyhedra, including all of the geometric complexity.

The boundary shape of the polyhedron is defined as being formed by some of the triangular faces of the polyhedron and some of the polyhedron virtual triangles, while the other polyhedron virtual triangles extend inside the volume of the boundary shape of the polyhedron.

The boundary of the polyhedron is defined as being formed by the triangular faces of the polyhedron, where some triangular faces of the boundary of the polyhedron can also extend inside the volume of the boundary shape of the polyhedron as in the case of an n dimensional polyhedron for example where more than 2 triangular faces can have a common edge.

Figure 1:
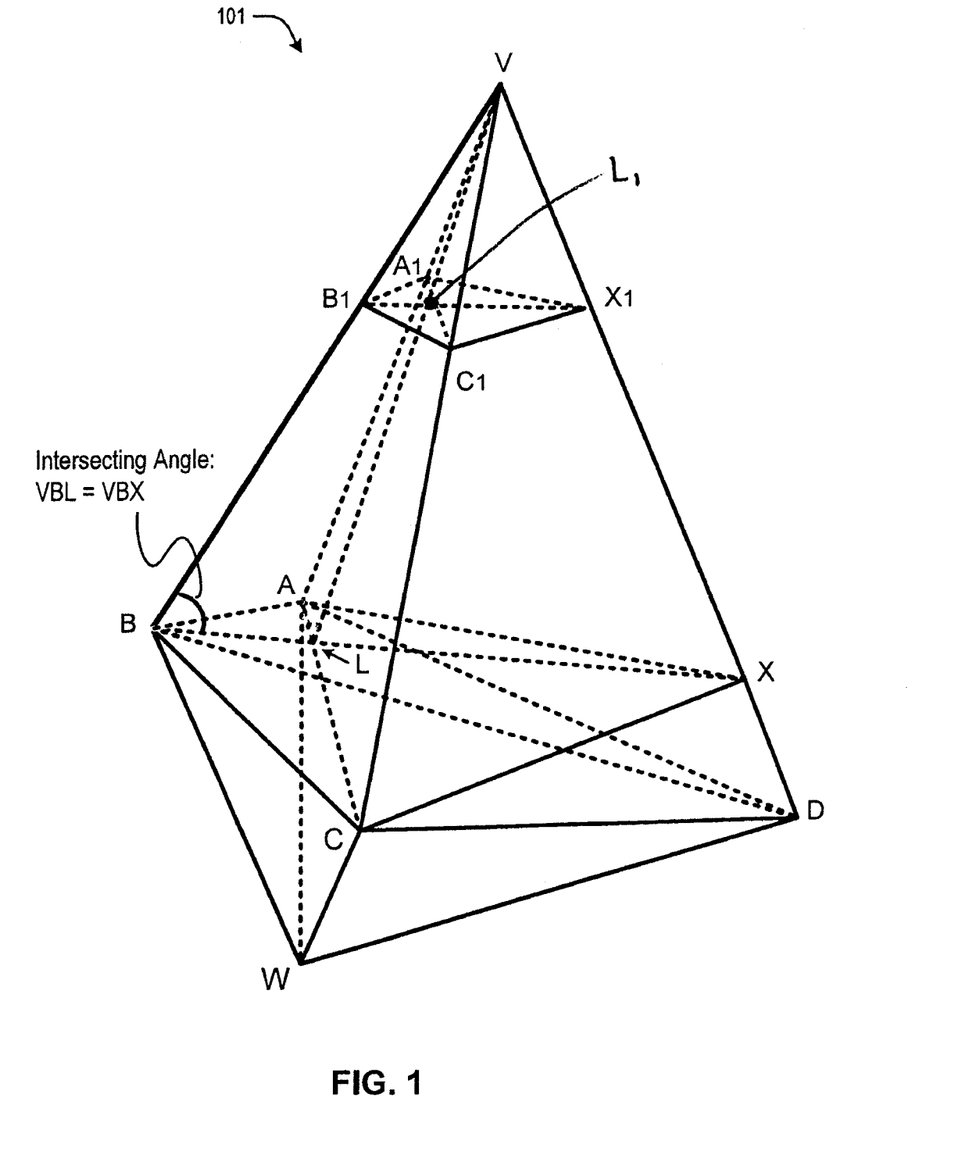
FIG. 1 is a perspective view of a polyhedron according to an embodiment.

FIG. 1 shows a polyhedron 101 constructed using method disclosed herein. At a first step of the method, the three-dimensional coordinates of the vertices (A, B, C, D, V, W) are provided. The method then proceeds to a second step, where the length of every line segment connecting the vertices (A, B, C, D, V, W) is determined using simple algebra. Those line segments form triangles (ABC, ABD, ABV, ABW, ACD, ACV, ACW, ADV, ADW, AVW, BCD, BCW . . . ). In one embodiment, some of these triangles form triangular faces of the vertices, and the Boundary of the polyhedron 101 (CWD, AWB, AWD, BWC, AVB, BVC, CVD, DVA) while the rest of these triangles form polyhedron virtual triangles. Adjacent vertices may have overlapping triangles. For example, vertex A has triangular face AVB overlapping the triangular face BVA of vertex B. The rest of the triangles may intersect. For example, triangle BVD intersects with triangle ABC. Putting all of the triangles together provides all the triangular faces of the polyhedron 101 and all of its vertices and all of the polyhedron virtual triangles. The method then proceeds to a third step, where all of the angles of all of the triangles are calculated. The method then proceeds to a fourth step, where it is determined which triangles belong to the same polygon. Thus, for example in the case of triangle VBW, if angle VBW is equal to angles VBA plus ABW, then triangle VBW belongs to the same polygon VBWA which will be a quadrilateral. Herein triangle VBW will partially overlap triangles AVB and ABW. In the case of FIG. 1, angle VBW is smaller than the sum of angles VBA and ABW, which results in VAB, ABW being two triangular faces of the polyhedron, and triangle VBW being a polyhedron virtual triangle. Notably, by determining the properties (e.g., dimensions, etc.) of the triangles that form the faces of the polyhedron, the dimensions of the faces of the polyhedron and surface area may be easily determined. The method then proceeds to a fifth step, where a vertex of the polyhedron 101 may be truncated.

At the fifth step of the method, at least one of the vertices is truncated (e.g., V) by forming all its possible truncating bases. While the truncation of vertex V at one of its truncating bases is described in great detail here, it should be appreciated that vertex V may be truncated at any of its other truncating bases, and a different or additional vertex may be truncated following the steps set forth herein. To truncate the vertex, one of the truncating bases is established. For example, the truncating base is established at 3 Vertices A, B, C that are adjacent to vertex V and adjacent to each other to form the truncating base triangle ABC, which will help calculate the truncating base and two truncating base lines AB and BC. That truncating base intersects edge VD at point X. To establish point X, we calculate the intersecting angle between edge VB and line BL, which is formed where polyhedron virtual triangles VBD and ABC intersect. This is angle VBX.

Point L is located where BX intersects AC, and angle VBX is equal to angle VBL. The intersecting angle is then determined using the known angles ABC, ABD, and DBC in polyhedron virtual triangles ABC, ABD and DBC. The ratio of angle ABD to angle DBC is equal to the ratio of angle ABL to angle LBC. Angle LBC is equal to angle ABC minus angle ABL. Therefore, ABD/DBC is equal to ABL/(ABC-ABL), and angle ABL is calculated. Knowing angles ABL and BAC and length AB in virtual triangle ABL, simple algebra and/or trigonometry is used to calculate the lengths of BL and AL. Because the lengths of AL and AV are known and angle VAL is equal to angle VAC in virtual triangle VAL, simple algebra and/or trigonometry is used to calculate angles ALV and AVL and length VL. Knowing lengths VL and VB and BL in virtual triangle VBL, we calculate angle BLV and the intersecting angle VBL which is equal to VBX. Because angle VBL is equal to angle VBX, angle BVX is equal to angle BVD, and length BV in virtual triangle VBX is known, we calculate length BX and length VX and thus establish X.

Because lengths VX and VC are known and angle CVX is equal to angle CVD in triangle CVX, we calculate the length of truncating base line CX. Because lengths VX and VA are known and angle AVX is equal to angle AVD in triangle AVX, we calculate the length of truncating base line XA. Thus, together with truncating base lines AB and BC, we establish the truncating base ABCX. If length VX is greater than length VD, the real truncating base A'B'C'D that is at an angle to ABCX and intersects VD at point D must be established. Truncation could then continue at parallel or at an angle to ABCD taking in account the restrictions imposed by the length of VD.

Vertex V is then truncated in one of the following ways. It can be truncated at the truncating base by determining the length of BX, which is the third edge of the virtual triangle BVX and also the third edge of the virtual triangles BCX and BAX. Or, it can be truncated at a plane parallel to the truncating base by determining new truncating lines (A1)(B1), (B1)(C1), (C1)(X1), and (X1)(A1). This provides new truncating polygon (A1)(B1)(C1)(X1). Each two of these new truncating lines (A1)(B1), (B1)(C1), (C1)(X1), and (X1)(A1), belong to a new truncating virtual triangle. New truncating virtual triangles (A1)(B1)(X1), and (B1)(X1)(C1) have a 3rd side (B1)(X1) that is parallel to BX and is also the 3rd side of another virtual triangle (B1)V(X1) formed by two non-adjacent edges of the vertex to be truncated. New truncating virtual triangles (A1)(B1)(C1), and (A1)(X1)(C1) have a 3rd side (A1)(C1) that is parallel to AC and is also the 3rd side of another virtual triangle (A1)V(C1). Suppose we start truncating at (A1) with known length V(A1) at a plane parallel to ABCX. (A1)(C1) and (B1)(X1) are lines parallel to AC and BX. They intersect with line VL at (L1). Since angles AVL and BLV are known quantities as calculated above, we can easily calculate angles VLC as 180-ALV and VLX as 180-BLV. These angle values give us the corresponding values of angles (A1)(L1)V and (B1)(L1)V and (C1)(L1)V and (X1)(L1)V. Knowing angle (A1)(L1)V and angle LVA equal to (L1)V(A1) gives us the value of angle V(A1)(L1). Knowing the value of all 3 angles of the triangle and length V(A1) allows us to calculate the length of the sides of said triangle. Thus we can calculate the lengths of V(B1) and V(C1) and V(X1). Knowing the length of those lines and the value of angles BAV and AVD and DVC and CVB allows us to calculate the lengths of (A1)(B1) and (B1)(C1) and (C1)(X1) and (A1)(X1). That gives us the dimensions of the truncating polygon (A1)(B1)(C1)(X1). Vertex V can also be truncated at an angle to the truncating base (FIG. 5), or at a plane parallel to a plane that is at an angle with the truncating base.

For the purpose of truncating vertices of a polyhedron at their real truncating bases, the truncating bases that intersect all edges of the vertex to be truncated need to be designated as real truncating bases. In all embodiments, there are limits on truncation, those limits are determined by lengths of edges to be truncated and angles of truncation that determined the real truncating bases and limits based on the amount of previous truncation at said vertex and at adjacent vertices.

The same method for truncation using the same exact steps described above can be used in another embodiment that can also be depicted in FIG. 1. FIG. 1 shows a polyhedron 101 constructed using a method disclosed herein. At a first step of the method, the three-dimensional coordinates of the vertices (A, B, C, D, V, W) are provided. The method then proceeds to a second step, where the length of every line segment connecting the vertices (A, B, C, D, V, W) is determined using simple algebra. Those line segments form triangles (ABC, ABD, ABV, ABW, ACD, ACV, ACW, ADV, ADW, AVW, BCD, BCW ... ) where some of the triangles form triangular faces of the vertices, and the Boundary of the polyhedron 101 (in this instance ABW, AWD, BWC, CWD, CVD, DVA, AVB, BVD, BDC), thus defining a polyhedron with a concavity in it, while the rest of the triangles form polyhedron virtual triangles (including triangle BVC, which is a polyhedron virtual triangle in this instance). Triangle BVC together with triangles AWB, AWD, BWC, CWD, CVD, DVA, AVB will form what's defined as the Boundary Shape of this polyhedron. Then the truncating base triangle ABC is established at adjacent vertices A, B and C that belong to the boundary shape of the polyhedron. Then the computations for truncation will proceed along the same computational sequence as has been described in the previous embodiment.

Also, the same method for truncation using the same steps described above can be used in another embodiment that can also be depicted in FIG. 1. FIG. 1 shows a polyhedron 101 constructed using a method disclosed herein. At a first step of the method, the three-dimensional coordinates of the vertices (A, B, C, D, V, W) are provided. The method then proceeds to a second step, where the length of every line segment connecting the vertices (A, B, C, D, V, W) is determined using simple algebra. Those line segments form triangles (ABC, ABD, ABV, ABW, ACD, ACV, ACW, ADV, ADW, AVW, BCD, BCW ... ) where some of the triangles form triangular faces of the vertices, and the Boundary of the polyhedron 101 (in this instance AWB, AWD, BWC, DWC, CVD, BVD, BDC, BAD), thus defining a polyhedron with a hole in it, while the rest of the triangles form polyhedron virtual triangles (including triangles BVC and AVD, which are polyhedron virtual triangles in this instance). Triangles BVC and AVD together with triangles AWB, AWD, BWC, CWD, BVA, DVC will form what's defined as the Boundary Shape of this polyhedron. Then the truncating base triangle ABC is established at adjacent vertices A, B and C that belong to the boundary shape of the polyhedron. Then the computations for truncation will proceed along the same computational sequence as has been described in the previous embodiment.

Those skilled in the art will appreciate from the descriptions contained herein that the inventive methods and apparatus do not involve any determination or use of midpoints and do not involve the computations of intersecting planes and half spaces. Further, those skilled in the art will appreciate that properties of the polyhedra may be determined using properties determined for the triangles, such as surface area.

EXAMPLE

Truncating at an Angle (Q) to the Truncating Base

Figure 5:
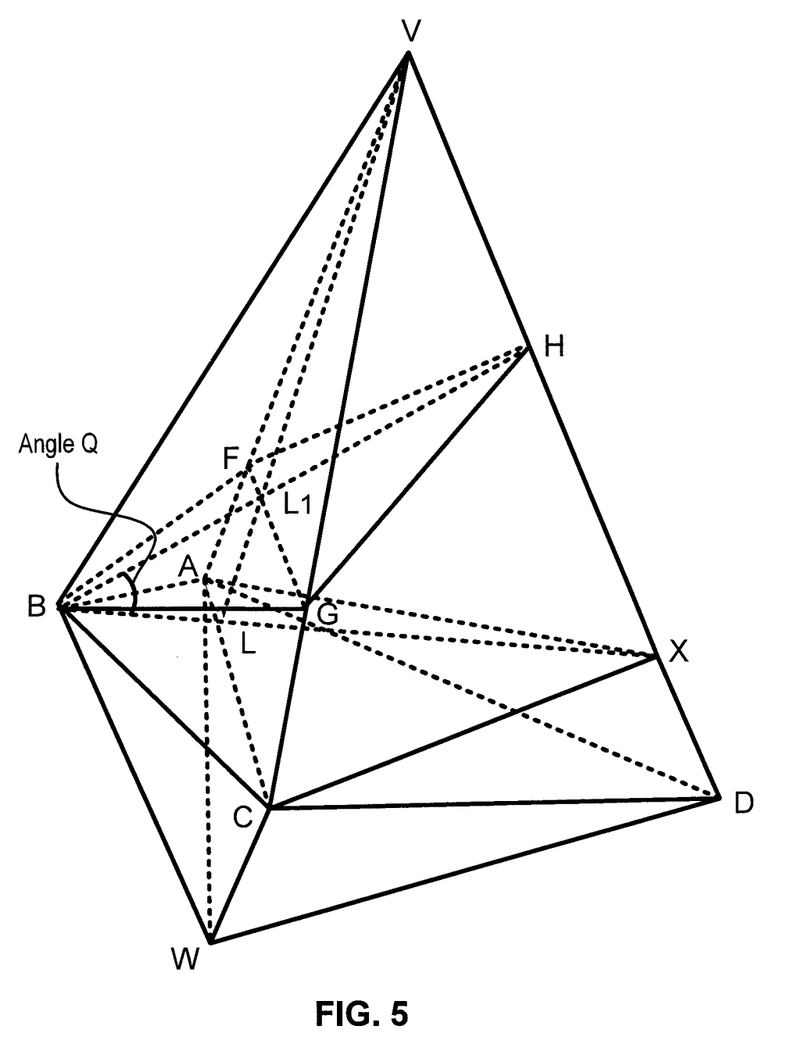
FIG. 5 is the polyhedron of FIG. 1 after being modified according to an embodiment.

The following example uses FIG. 5 and truncates either at a chosen angle (Q) to the truncating base starting at point B, or at a chosen point H on line VX with chosen distance VH. Suppose we chose the value of angle Q. The angle values we can truncate at should be less than the value of angle VBX. On the polyhedron, we draw Line BH at an angle (Q) with line BX, where (Q) is less than angle VBX and where H is a point on VX. Knowing angles (Q) and BXV, and length of BX in triangle BXH, we calculate lengths of HX and HB, and determine point H. If we had started with a chosen point H, we would calculate angle Q and proceed to the next step. BH intersects VL at point (L1). We need to draw a line FG which passes through (L1), with F being a point on AV, and G being a point on CV. We need to determine points F and G.

We draw line FG at parallel to AC. Knowing angle (L1)BL is equal to (Q) and angle BLV, and length of BL, we calculate length of (L1)L in triangle (L1)BL. Knowing that angle V(L1)G is equal to VLC (which is equal to 180-VLA,) that angle (L1)GV is equal to ACV, and that length V(L1) is equal to VL-(L1)L, in triangle V(L1)G we calculate length of (LOG and length of VG and establish G. Knowing angle V(L1)F is equal to VLA, and angle (L1)FV is equal to CAV, and length V(L1) in triangle V(L1)F, we calculate length of (L1)F and length of VF and establish F. Knowing VF and VG and angle FVG in triangle FVG, we calculate length of FG. We connect points B, F, H, G, and B to get new truncating lines BF, FH, HG and GB. Knowing angle BVA and lengths of BV and FV in triangle BVF, we calculate length of FB. Knowing angle XVA and lengths of FV and VH in triangle FVH, we calculate length of FH. Knowing angle XVC and lengths of HV and VG in triangle HVG, we calculate length of HG. Knowing angle CVB and lengths of GV and BV in triangle GVB, we calculate length of GB. New truncating lines BG and GH with BH form one new truncating triangle BGH. New truncating lines BF and FH with BH form another new truncating triangle BFH. Those two new truncating triangles form the new truncating polygon BGHF that determines the new face of the truncated polyhedron and is the new Vertex figure of Vertex V.

We can use the same method described above that established a truncating base triangle ABC to determine the rest of the truncating bases of Vertex V. We establish truncating base triangles BCD and ADC and DBA that determine their own truncating bases. We can truncate at an angle to the truncating bases or parallel to the truncating bases or parallel to truncation at an angle to the truncating bases. To truncate parallel to truncation at an angle, we draw a line parallel to FG at a chosen distance and then we can proceed to do the calculations as described for truncating in parallel. Alternatively, we can truncate vertex V at these truncating bases if they are the real truncating bases after we designate them as such. In case a truncating base is not a real truncating base, we establish the real truncating base at an angle to the truncating base.

EXAMPLE

Truncating a Polyhedron of Another Embodiment

Figure 6:
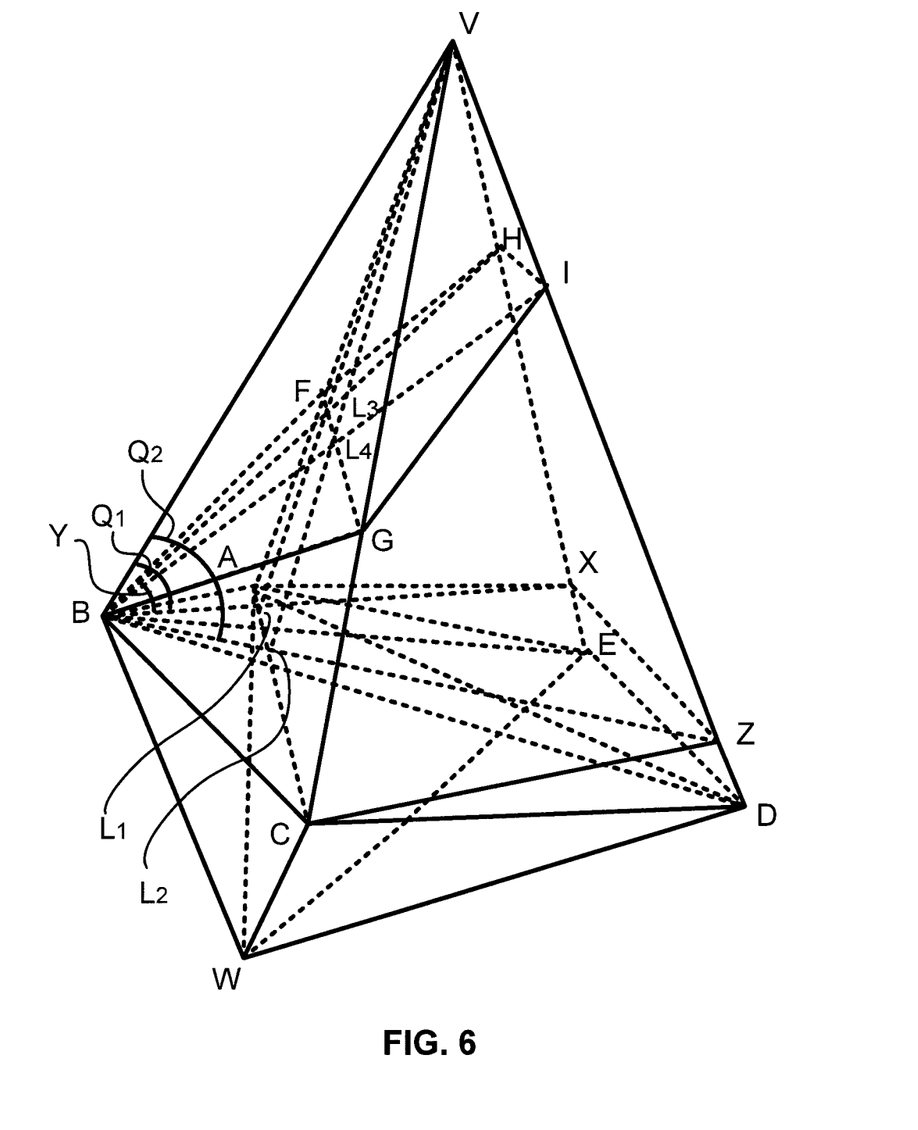
FIG. 6 is another polyhedron after being modified according to an embodiment.

The same method described above may be used to establish the value for all the intersecting angles needed to establish the truncating bases when the boundary shape of the Vertex to be truncated has more than four triangles, like for example in FIG. 6. In one embodiment that can be depicted in FIG. 6, Vertex V has five triangular faces VAB, BVC, CVD, DVE and EVA. To establish one of its truncating bases at truncating base triangle ABC, we need to establish the values of two intersecting angles (Q1) and (Q2). (Q1) is established since the ratio of angles ABE/EBC is equal to the ratio of angles AB(L1)/(L1)BC. Angle (L1)BC is equal to angle ABC minus angle AB(L1). Therefore, ABE/EBC is equal to AB(L1)/[ABC-AB(L1)], and angle AB(L1) may be calculated. (Q2) is established since the ratios of angles ABD/DBC is equal to the ratio of angles AB(L2)/(L2)BC. Angle (L2)BC is equal to angle ABC minus angle AB(L2). Therefore, ABD/DBC is equal to AB(L2)/[ABC-AB(L2)], and angle AB(L2) may be calculated. Then we continue the steps as described above in relation to FIG. 1 to calculate angles (Q1) and (Q2), and then proceed to calculate the base.

Then we proceed to calculate lengths of A(L1), (L1)(L2), and (L2)C. We have two truncating base lines AB and BC. We calculate the lengths of the other three truncating base lines CZ, ZX, and XA. We truncate at base or parallel to base or at an angle to the base etc. If we are truncating at an angle (Y) to base, we draw BH at an angle (Y) to BX. BH intersects V(L1) at point (L3). The following takes FG parallel to AC, with F being a point on AV, and G on CV. FG passes through point L3. We establish points F and G following the same exact steps as for the octahedron above. We determine length of FG. We determine point (L4) where V(L2) intersects FG using (L3)(L4)/FG is equal to (L1)(L2)/AC. We establish the fifth vertex I of the new truncating pentagon where B(L4) intersects VZ. We create a new truncating pentagon BGIHF formed of three new truncating virtual triangles BGI, IBH, and HBF, whose sides we can calculate, thus calculating the dimensions of the pentagon.

The same method described above can be used in another embodiment that can also be depicted in FIG. 6. FIG. 6 shows a polyhedron constructed using method disclosed herein. At a first step of the method, the three-dimensional coordinates of the vertices (A, B, C, D, E, V, W) are provided. The method then proceeds to a second step, where the length of every line segment connecting the vertices (A, B, C, D, E, V, W) is determined using simple algebra. Those line segments form triangles (ABC, ABD, ABV, ABW, ACD, ACV, ACW, ADV, ADW, AVW, BCD, BCW, ABE, EVA, EVD . . . ) where some of the triangles form triangular faces of the vertices, and the Boundary of the polyhedron (in this instance AWB, AWE, EWD, BWC, CWD, BVC, BVA, CVD, AVE, BVD, EVB, EBD), defining a polyhedron with a concavity in it, while the rest of the triangles form polyhedron virtual triangles (including triangle DVE, which is a polyhedron virtual triangle in this instance). Triangle DVE together with triangles AWB, AWE, EWD, BWC, CWD, BVC, BVA, CVD, AVE will form what's defined as the Boundary Shape of this polyhedron. Then the truncating base triangle ABC is established at adjacent vertices A, B and C that belong to the boundary shape of the polyhedron. Then the computations for truncation will proceed along the same exact computational sequence as has been described in the previous embodiment. Truncating this new polyhedron at an angle Y for example will give us two new truncating polygons, BGI and BHF.

This above polyhedron can have a solid part, for example, defined by the pyramid ABCDEW, and two hollow spaces defined by the pyramids BVDC and EBAV and a concavity VBED, where four faces AVB, BVC, BVD and BVE will have edge BV in common.

We can use the same method described above that established a truncating base triangle ABC to determine the rest of the truncating bases of Vertex V. We establish truncating base triangles BDC and CDE and DEA and EAB that determine their own truncating bases. We can truncate at an angle to the truncating bases or parallel to the truncating bases or parallel to truncation at an angle to the truncating bases. Alternatively, we can truncate vertex V at these truncating bases if they are the real truncating bases after we designate them as such. In case a truncating base is not a real truncating base, we establish the real truncating base at an angle to the truncating base.

Optionally, one can get vertex and line length data of an object from real life, then display that information, and then proceed to truncate this object using the method described above.

Using these examples above, those skilled in the art can see how to truncate an asymmetric general polyhedron of n dimensions that can be concave and that can have a hole, using simple math.

Figure 2:
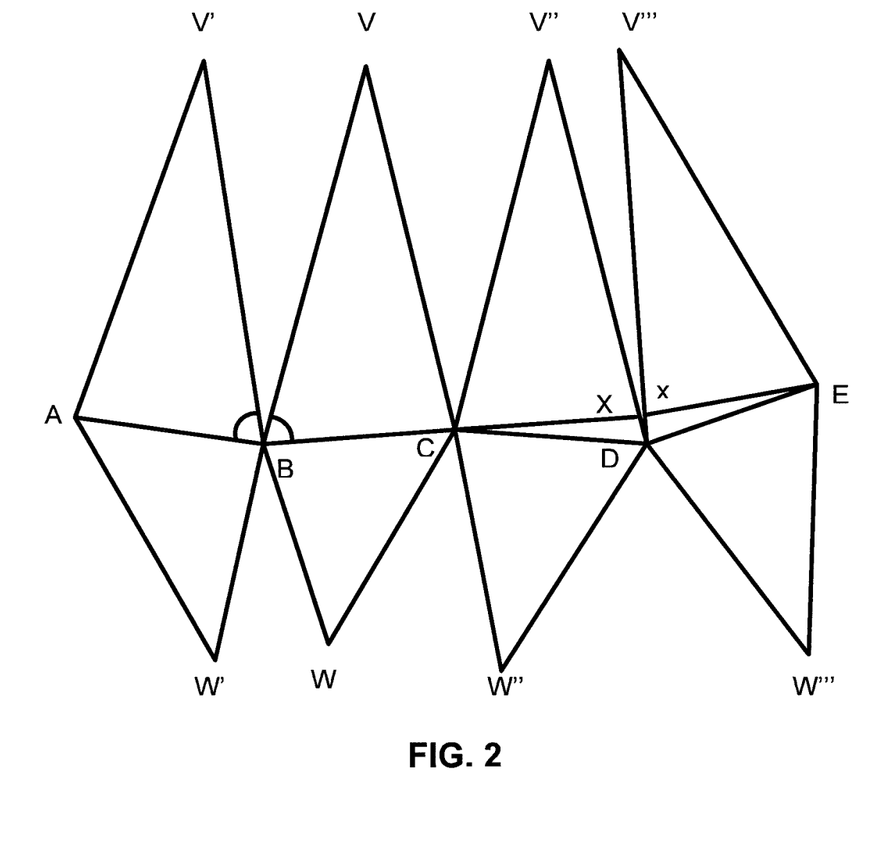
FIG. 2 is a polyhedral net of the polyhedron of FIG. 1.
Figure 3:
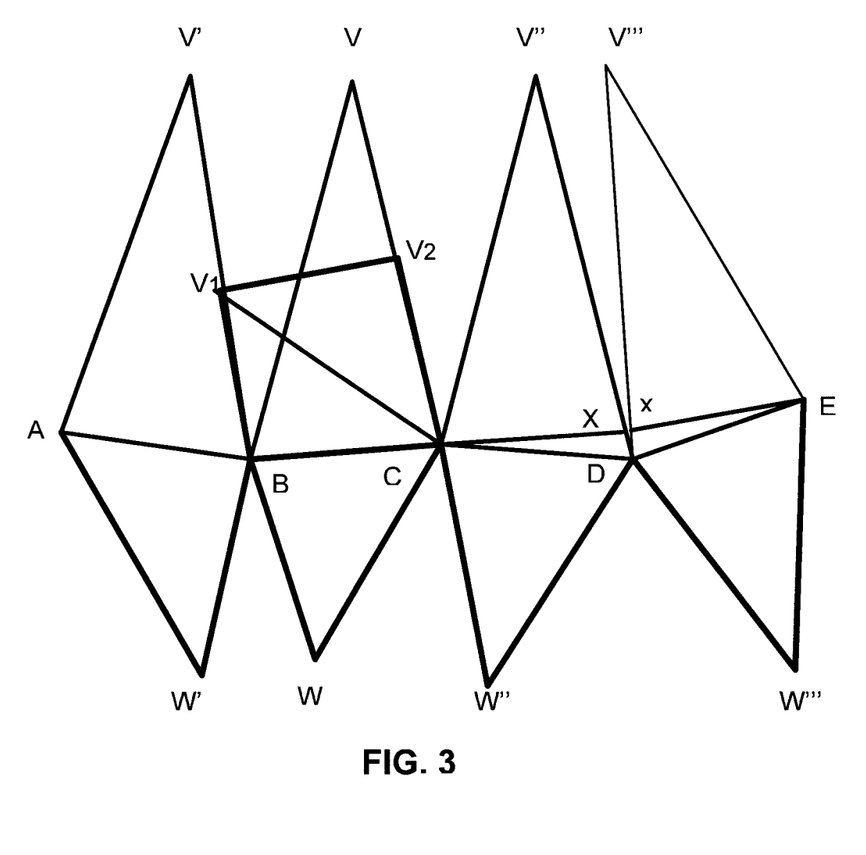
FIG. 3 is the polyhedral net of FIG. 2 after being modified according to an embodiment.
Figure 4:
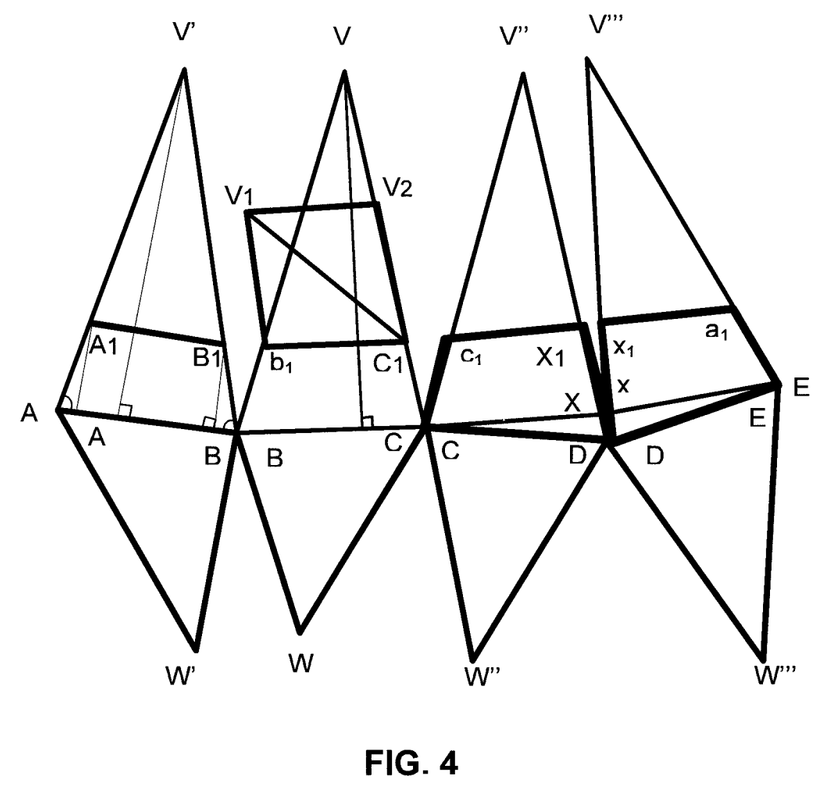
FIG. 4 is the polyhedral net of FIG. 2 after being modified according to an embodiment.

Plotting Information on a Polyhedral Net (FIGS. 2, 3, 4)

Polyhedral nets are drawn using information gathered as set forth above. First, we draw the polyhedral net 102 of the polyhedron 101 with its truncating base delineated (FIG. 2). We can draw the triangular faces of the vertex V by drawing four triangles A(V')B, B(V)C, C(V'')D, and D(V''')E. When the polyhedral net 102 is cut and taped together, apices (V') (V)(V'')(V''') will meet to form vertex V of the polyhedron. Points B, C, D represent vertices B, C, D of the polyhedron. Point E will meet at point A to form vertex A of the polyhedron. We modify the polyhedral net to establish a truncating base for vertex V. We define the truncating base ABCX by drawing truncating base lines CX and xE on faces C(V″)D and D(V‴)E respectively. X and x of the polyhedral net meet at point X of the polyhedron.

We can truncate at the truncating base (FIG. 3).

As shown in FIGS. 1 and 4, truncating at a new truncating plane (A1)(B1)(C1)(X1) that is parallel to truncating base ABCX gives us new truncating lines (A1)(B1), (b1)(C1), (c1)(X1), and (x1)(a1) on the polyhedral net. Points (B1) and (b1), (C1) and (c1), (X1) and (x1), (a1) and (A1) of the polyhedral net, meet to form points (B1), (C1), (X1), and (A1) of the polyhedron respectively.

On the net in FIG. 4, we draw a new quadrilateral face (b1)(V1)(V2)(C1) formed of two triangles (b1)(V1)(C1) and (C1)(V1)(V2) with dimensions equal to those of the new truncating quadrilateral (A1)(B1)(C1)(X1) from (FIG. 1).

We then separate the new polyhedral net around the perimeter. We separate along (A)-(A1), (A1)-(B1), (B1)-(B), (B)-(b1), (b1)-(V1), (V1)-(V2), (V2)-(C1), (C1)-(C), (C)-(c1), (c1)-(X1), (X1)-(D), (D)-(x1), (x1)-(a1) and (a1)-(E) . . . and continue separating around the rest of the perimeter of the polyhedral net of the octahedron. We fold the folding lines, and tape the adjacent edges together.

Implementation of and Apparatus for Practicing the Disclosed Method

Figure 7:
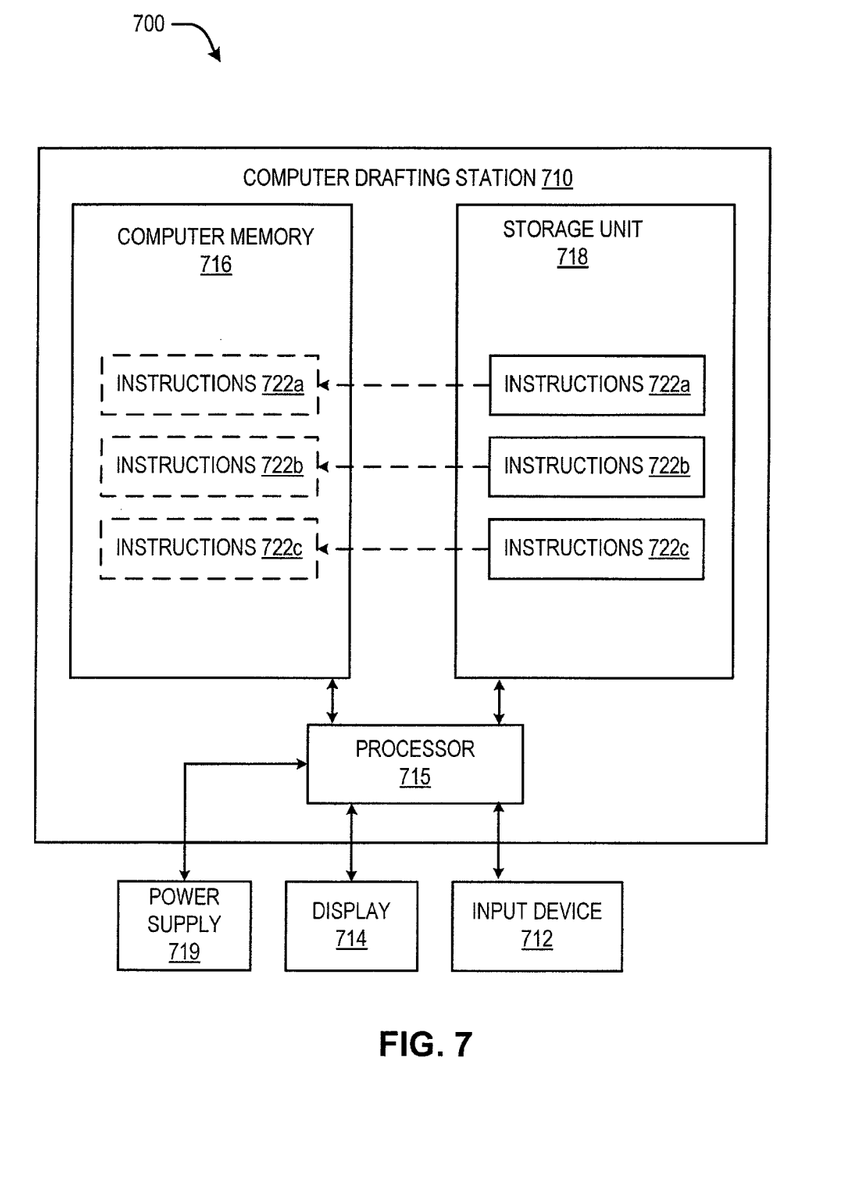
FIG. 7 schematically shows elements of an apparatus for creating truncated polyhedra according to an embodiment.

FIG. 7 shows an apparatus 700 for creating and truncating general polyhedra without using complex formulas and without requiring advanced computer processors and computer memory. Apparatus 700 includes a computer drafting station 710. Computer drafting station 710 includes an input device 712 (e.g., a keyboard, mouse, trackball, joystick, or any other device that may be used to input electronic data) and a display 714 (e.g., a computer display, a projection device, a LCD display, a cathode ray tube display, a plasma display, a LED display, or any other appropriate display). Drafting station 710 may further include at least one processor 715, computer memory 716, and a storage unit 718. The storage unit 718 may be, for example, a disk drive that stores programs and data of the computer drafting station 710. It should be appreciated that the computer drafting station 710 may be constructed without the storage unit 718, though the storage unit 718 may provide additional programming flexibility. The processor 715 is in data communication with the input device 712, the display 714, and the computer memory 716. A power supply 719 (i.e., AC power or DC power, including a battery or a solar cell, for example) is electrically coupled to the processor 715 to power the processor 715.

The storage unit 718 is illustratively shown storing (and providing to computer memory 716) machine readable instructions 722a for storing vertex data input to the processor 715 via the input device 712, machine readable instructions 722b for implementing the method set forth above to truncate a polyhedron created using the vertex data, and machine readable instructions 722c for actuating the display 714 to present data. As noted above, the instructions may be contained in the computer memory 716 without use of the storage unit 718.

It is understood that while certain forms of this invention have been illustrated and described, it is not limited thereto except insofar as such limitations are included in the following claims and allowable functional equivalents thereof.

What is claimed is:

1. An apparatus for modeling general polyhedra without using complex formulas and without requiring advanced computer processors and computer memory, the apparatus comprising:

at least one processor;
means for inputting vertex data to the processor;
a display in data communication with the processor; and
computer memory coupled to the processor and having recorded within it machine readable instructions for:
  storing vertex data previously input to the processor;
  determining all triangles that meet at each vertex represented by the vertex data;
  determining all triangular faces corresponding to each vertex;
  determining polyhedron virtual triangles corresponding each vertex;
  determining all polygonal faces corresponding to each vertex;
  modeling a polyhedron using the vertex data; and
  actuating the display;
wherein the instructions for modeling a polyhedron utilize length data and angle data for the determined triangles;
wherein the instructions for modeling a general polyhedron are instructions for modeling all General Polyhedra and include instructions for:
  establishing lines with known lengths between the vertices;
  establishing triangles with known angles from the established lines to form triangular faces of vertices of a polyhedron with some of the triangles and to form polyhedron virtual triangles with others of the triangles; and
  forming polygons that define the faces of the polyhedron using triangular faces;
wherein the instructions for modeling a general polyhedron apply equally to:
  (a) a polyhedron having four faces; and
  (b) a polyhedron having more than four faces, where two or more faces share a common edge;
wherein the instructions for modeling a polyhedron apply equally to concave and convex polyhedrons;
wherein the instructions for modeling a polyhedron apply equally to polyhedra with symmetry and polyhedra with no symmetry;
wherein the instructions for modeling a polyhedron apply equally to polyhedra with holes and polyhedra with no holes;
wherein the instructions for modeling a polyhedron apply equally to polyhedra that is solid and polyhedra that is at least partially hollow;
wherein the means for inputting vertex data includes a keyboard;
wherein the display is a computer display; and
wherein the apparatus further comprises means for powering the processor.

2. An apparatus for creating and truncating polyhedra having more than four faces, the apparatus comprising:
at least one processor;
means for inputting vertex data to the processor;
a display in data communication with the processor; and
computer memory coupled to the processor and having recorded within it machine readable instructions for:
  storing vertex data previously input to the processor;
  creating a polyhedron created using the vertex data;
  truncating the polyhedron created using the vertex data; and
  actuating the display;
wherein the instructions for creating and the instructions for truncating utilize length data and angle data for triangles formed from the vertex data;

wherein the instructions for creating and the instructions for truncating include instructions for:
- forming two truncating base lines for a respective vertex to be truncated;
- calculating the length of additional truncating base lines that complete a truncating base for the vertex to be truncated;
- forming truncating virtual triangles that have sides with known lengths and angles from the truncating base lines; and
- forming a truncating virtual polygon having at least four sides from the truncating base with the truncating base lines as its sides;

wherein the instructions for creating and the instructions for truncating do not determine and do not utilize any indication that a point is a midpoint; and wherein the instructions for creating and the instructions for truncating do not determine and do not utilize any:
- (a) intersecting half plane;
- (b) moving plane;
- (c) half space; and
- (d) intersecting plane.

3. The apparatus of claim 2, wherein the instructions for creating and the instructions for truncating include instructions for forming new truncating lines to truncate parallel to the truncating base.

4. The apparatus of claim 2, wherein the instructions for creating and the instructions for truncating include instructions for forming new truncating lines to truncate at an angle to the truncating base.

5. The apparatus of claim 2, wherein the instructions for creating and the instructions for truncating include instructions for forming new truncating lines to truncate parallel to truncation at an angle to the truncating base.

6. The apparatus of claim 2, wherein the instructions for truncating include limitations on truncation determined by length of edges to be truncated; angles of truncation that determined the real truncating bases; amount of previous truncation, and amount of truncation of adjacent vertices.

7. The apparatus of claim 2, wherein the instructions for truncating include instructions for:
- forming new truncating lines;
- establishing the dimensions of new truncating triangles with known side lengths from the new truncating lines; and
- forming new truncating polygons from the new truncating triangles.

8. The apparatus of claim 7, wherein the instructions for creating and the instructions for truncating include instructions for plotting on a polyhedral net.

9. The apparatus of claim 7, wherein the instructions for creating and the instructions for truncating include instructions for printing the polygonal faces of the polyhedron separate from each other.

* * * * *